United States Patent
Chethik

[11] Patent Number: 6,144,786
[45] Date of Patent: Nov. 7, 2000

[54] HIGH BANDWIDTH-TIME PRODUCT CONTINUOUSLY VARIABLE CONTROLLED DELAY SYSTEM

[75] Inventor: Frank Chethik, Palo Alto, Calif.

[73] Assignee: Lockheed Martin Corporation, Bethesda, Md.

[21] Appl. No.: 09/266,646

[22] Filed: Mar. 11, 1999

[51] Int. Cl.[7] ...................................................... G02B 6/28

[52] U.S. Cl. ................................ 385/24; 385/31; 385/15; 385/39; 359/127

[58] Field of Search .................................. 385/15, 24, 31, 385/39, 32; 359/140, 127, 195

[56] References Cited

U.S. PATENT DOCUMENTS

| | | | |
|---|---|---|---|
| 5,109,449 | 4/1992 | Newberg et al. | 385/24 |
| 5,859,939 | 1/1999 | Fee et al. | 385/24 |
| 6,016,371 | 1/2000 | Wickham et al. | 385/24 |

*Primary Examiner*—James Phan
*Attorney, Agent, or Firm*—Kenneth W. Float

[57] ABSTRACT

Delay systems that employ switched discrete delay elements and continuously variable controlled delay elements to achieve a continuous (glitchless) delay range. The delay systems incorporate several technologies and subsystems to realize very high bandwidth-time product delay elements to provide for precise and continuous delay control.

11 Claims, 3 Drawing Sheets

6,144,786

HIGH BANDWIDTH-TIME PRODUCT CONTINUOUSLY VARIABLE CONTROLLED DELAY SYSTEM

BACKGROUND

The present invention relates generally to signal delay systems, and more particularly, to signal delay systems that employ high bandwidth-time product continuously variable controlled delay elements.

For many delay system applications, the required continuous (glitchless) delay range is considerably in excess of that available from the current state of technology, particularly where wide RF signal bandwidth is required. For a delay element bandwidth exceeding a few GHz, the likelihood of using digitizing techniques and using digital delays are highly doubtful due to the unavailability of suitable A/D and D/A converter technology.

Accordingly, it would be advantageous to have signal delay systems that employ high bandwidth-time product continuously variable controlled delay elements to provide a continuous (glitchless) delay range.

SUMMARY OF THE INVENTION

The present invention provides for delay systems that employ switched discrete delay elements and continuously variable controlled delay elements to achieve a continuous (glitchless) delay range. The delay systems incorporate several technologies and subsystems to realize very high bandwidth-time product delay elements to provide for precise and continuous delay control.

An exemplary delay system comprises a signal splitter that couples an input signal along upper and lower signal paths. The upper path contains an upper discretely switched delay element and an upper continuously variable controlled delay element. The lower path contains a lower discretely switched delay element and an lower continuously variable controlled delay element. Outputs of the upper and lower continuously variable controlled delay element are coupled to a cross-correlating delay error detector. The output signal from the delay error detector is coupled to a signal transfer clutch that outputs a delayed output signal from the system. A delay element controller is used to control the upper and lower discretely switched delay elements, the upper and lower continuously variable controlled delay element, the cross-correlating delay error detector and the signal transfer clutch.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

The present invention incorporates several technologies and subsystems to realize very high bandwidth-time product delay elements that provide the ability to achieve precise and continuous delay control. The system approach and the constituent technologies are described below.

Figure 1:
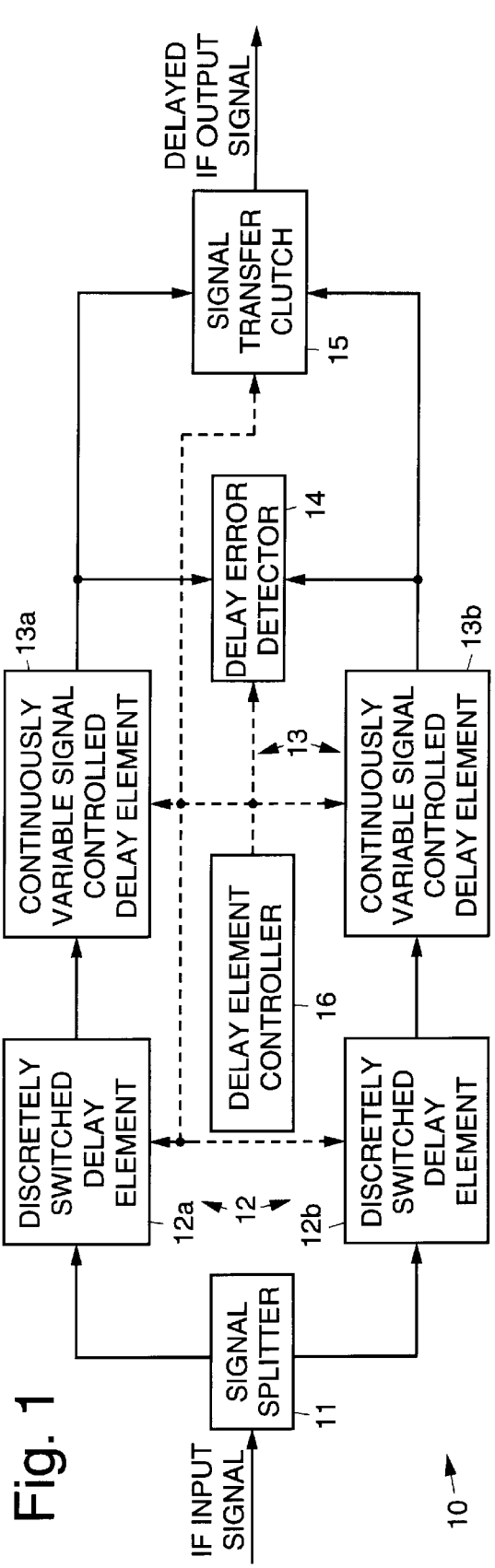
FIG. 1 illustrates a "ping-pong" delay system in accordance with the principles of the present invention.

Referring to the drawing figures, FIG. 1 illustrates a "ping-pong" delay system 10 in accordance with the principles of the present invention. The delay system 10 employs high bandwidth-time product continuously variable controlled delay elements 13.

The delay system 10 comprises a combination of discretely switched delay elements 12 together with the continuously variable controlled delay elements 13. In many system applications the delay versus time profile is highly predictable to within a small error. In systems using synchronous satellites, for example, satellite motion parameters are well known, and the daily variation in time differences of arrival of signals at an array of Earth terminals is highly predictable. The present invention is particularly well suited to these types of applications.

More particularly, the delay system 10 comprises a signal splitter 11 that receives an input signal, such as an intermediate frequency (IF) input signal and couples it along upper and lower signal paths. The upper path contains an upper discretely switched delay element 12a and an upper continuously variable controlled delay element 13a, while the lower path contains a lower discretely switched delay element 12b and a lower continuously variable controlled delay element 13b. Outputs of the upper and lower continuously variable controlled delay element 13a, 13b are coupled to a cross-correlating delay error detector 14 and to a signal transfer clutch 15 which outputs a delayed output signal from the delay system 10. A delay element controller 16 is coupled to the upper and lower discretely switched delay elements 12a, 12b, the upper and lower continuously variable controlled delay element 13a, 13b, the cross-correlating delay error detector 14 and the signal transfer clutch 15.

The magnitude and value of the discrete delay increments depend on the realizable range of the variable delay elements 13 in the system 10. It is assumed that switching of incremental delay together with renormalization of the variable delay requires a finite time interval during which signal transmission continues and must continue to be received uninterruptedly.

The delay system 10 shown in FIG. 1 requires that the delay range of the variable delay elements 13 are larger than the minimum increment of the discretely switched elements 12. The basic concepts implemented in the ping-pong delay system 10 will be described in terms of an increasing delay scenario.

Assume that the signal path through the upper discretely switched delay 12a and the upper continuously variable delay element is nearing the maximum of its range and it is desired to continue to increase the signal delay. The delay of the lower path is incremented so that it approximates the delay through the upper path, but the lower continuously variable controlled delay element 13b is set near the minimum of its range.

The lower continuously variable controlled delay element 13b is adjusted until the delays of the upper and lower paths are matched as determined by the cross-correlating delay error detector 14. When a delay match is indicated, the transfer clutch 15 is activated. The transfer clutch 15 gradually combines the signal from the lower signal path with the signal from the upper path while reducing the magnitude of the signal from the upper path. This continues until an output port of the transfer clutch 15 contains only the signal from the lower signal path. In this manner, a switchover occurs without a phase glitch that may cause a demodulator (not shown) located downstream from the delay system 10 to lose synchronism.

Up to a 90° carrier phase difference in the paths may be accommodated without a disturbance in receiver function. The transfer requires several tens of milliseconds and is controlled by the delay element controller 16. A transfer performed in this manner avoids an abrupt phase change with the risk of receiver loss of lock or "ambiguity flip".

The number and size of the delay increments depends on the range of each of the continuously variable controlled delay elements 13 which is largely determined by the technology used in their implementation. Implementation alternatives for the continuously variable controlled delay element 13, the discretely switched delay element 12 and the transfer clutch 15 will be discussed below.

Figure 2:
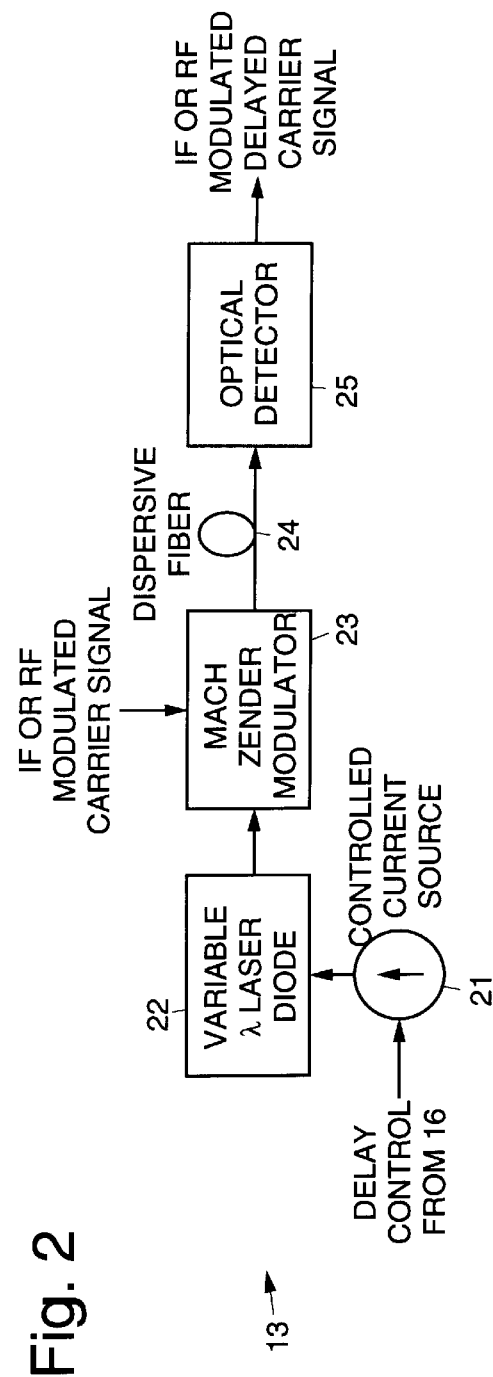
FIG. 2 illustrates a variable index fiber realization of a continuously variable delay element.

Implementation of the continuously variable controlled delay element 13 may use a variable index fiber 24 (FIG. 2). The use of variable index fiber 24 is described only as an exemplary implementation of this part of the delay system 10, and it is to be understood that other implementations are also possible. A continuously variable controlled delay element 13 with very wide bandwidth may be implemented using the dispersive property of some types of optical fiber 24 and its topology as is shown in FIG. 2. More particularly, FIG. 2 illustrates a variable index fiber realization of a continuously variable delay element 13.

The glass of the optical fiber 24 exhibits a small variation in propagation velocity with wavelength. Using a tunable laser diode 22 where the wavelength is controlled by diode conduction current produces a variable signal delay medium. The light output of the laser diode 22 may be modulated with an RF or IF signal using a (Mach Zender) modulator 23 to alter its wavelength to vary the delay over a fixed length of the optical fiber 24. The output of the optical fiber 24 is coupled to an optical detector 25 that outputs an RF or IF modulated delayed carrier signal.

The optical variable delay system 13 shown in FIG. 2 typically yields no more than about 100 ppm of variable delay from the variable index, dispersive fiber 24. For the continuously variable controlled delay element 13 to produce a variation in delay on the order of 10 nanoseconds, for example, the gross delay of the fiber 24 must be 100 microseconds. The length of the fiber 24 is thus about 15 miles. Although very long, it is of little consequence, since the fiber 24 has low loss and a very wide bandwidth.

Figure 3:
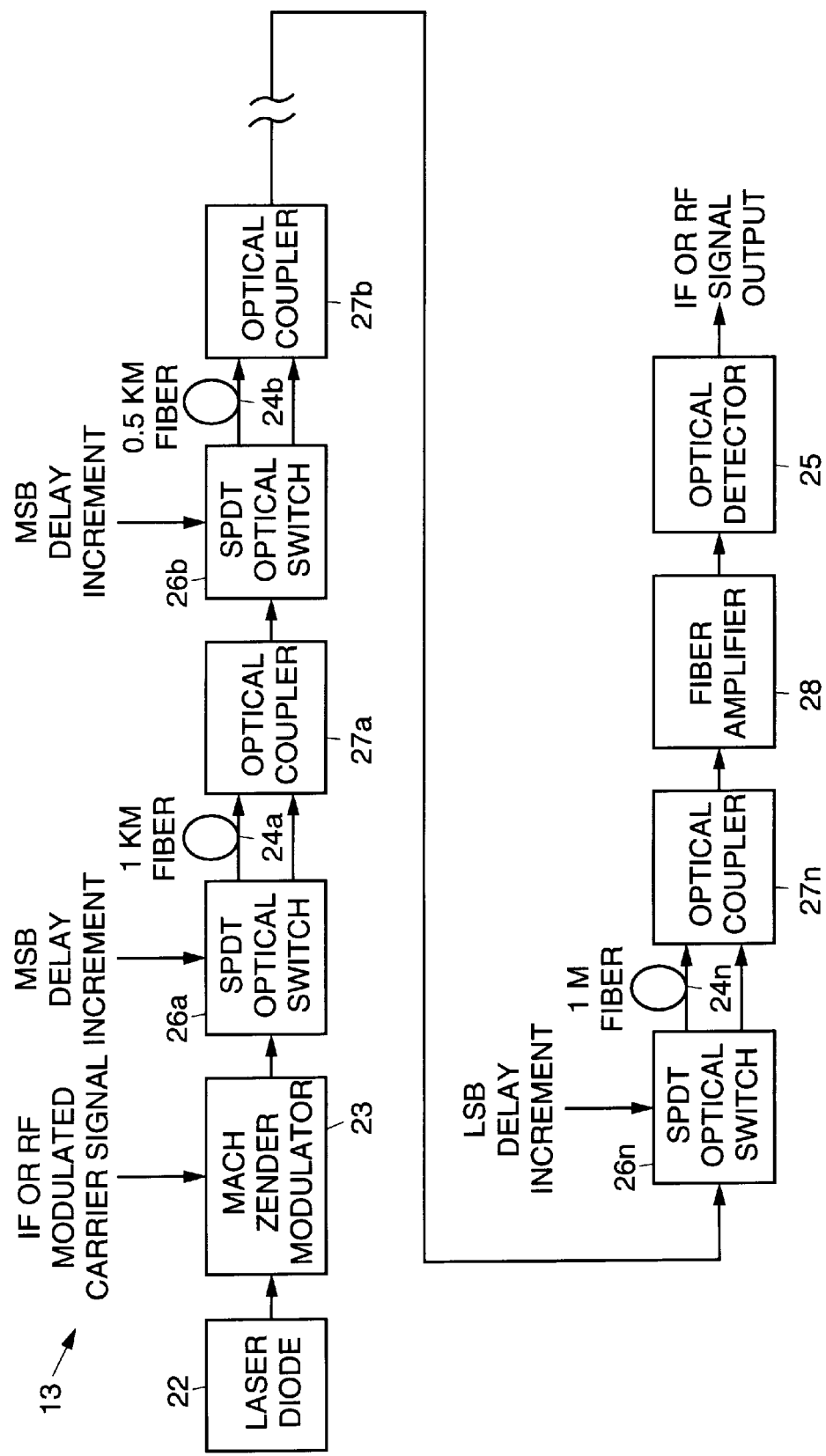
FIG. 3 illustrates a 1024 increment switched optical delay element in accordance with the principles of the present invention.

A discretely switched delay element 12 comprising a switched incremented delay element 12, may be used in the delay system 10. To achieve a switched overall delay variation on the order of 10 microseconds, the discretely switched part of the delay system 10 must then be capable of switching its delay in less than 10 nanosecond increments from nominally zero delay to 10 microseconds. This range requires about 1000 (1024) increments of delay. This may be accomplished by means of switching as few as 10 delay lines where each is half the delay of its next larger increment as shown in FIG. 3. More particularly, FIG. 3 illustrates a 1024 increment switched optical delay element 12 (comprising the discretely switched delay element 12) that provides a delay off up to 10 microseconds.

One implementation of the incremental delay elements 12 may use an optical fiber medium 24 (optical fiber 24). The largest delay section of about 5 microseconds would be required to be about 1 kilometer length, and the smallest section would be about 1 meter in length. A single laser diode 22 is modulated by the RF or IF signal to be delayed using a (Mach Zender) modulator 23. An external modulator 23 is shown since greater bandwidth may be obtained than is available by directly RF modulating the diode conduction current. A series of delay sections, each comprising a single pole, double throw optical switch 26a . . . 26n, a section of optical fiber 24a, . . . 24n, and an optical coupler 27a, . . . 27n, are serially coupled between the modulator 23 and a fiber amplifier 28. The output of the fiber amplifier 28 is coupled to an optical detector 25 that outputs an RF or IF modulated delayed carrier signal.

It is assumed that the optical switches 26 are lossy and that after several switching stages, optical amplification is required so that the signal-to-noise ratio of the final optical to RF conversion process provided by the optical detector 25 is not degraded. An Erbium doped fiber amplifier 28 may be used for this purpose. It is estimated that 2 or 3 amplification stages (multiple fiber amplifiers 28) would be distributed among the switched delay stages.

The overall stability of the fiber delay sections is important. The absolute delay stability of the ensemble of fiber delay elements 13 is unimportant, but the relative drift is important. For 10 bit delay control, having a monotonic increase in delay with increasing delay control (10 bit binary) number is important. It is possible to achieve this monotonicity by maintaining a uniform thermal environment among the fiber sections. Small systematic delay variations and differences between the upper and lower delay paths may be calibrated and compensated by the controller 16.

Figure 4:
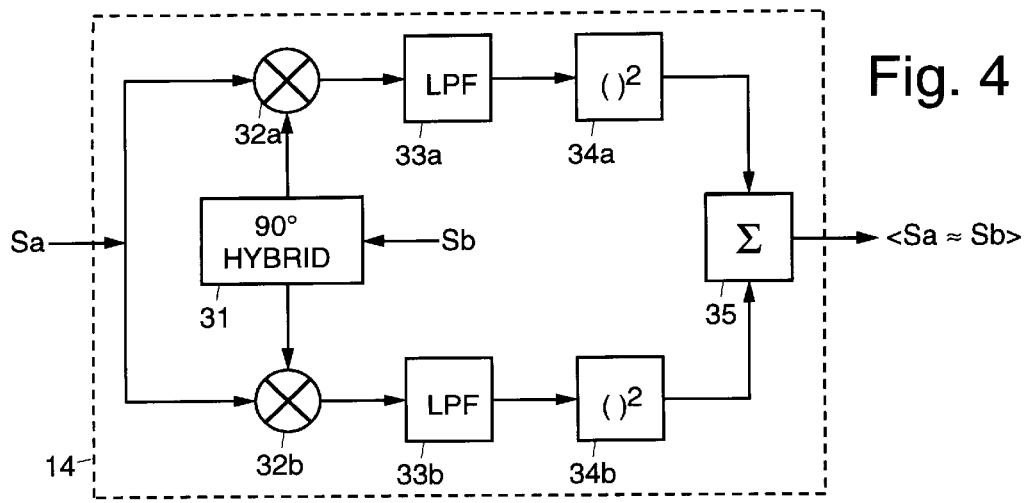
FIG. 4 illustrates a cross-correlator employed in the present invention.
Figure 4A:
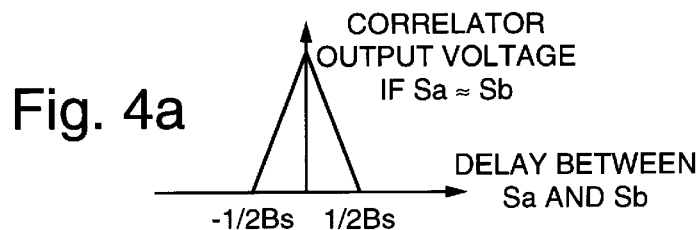
FIG. 4a illustrates the output voltage of the cross-correlator of FIG. 4 versus delay.

The cross-correlating delay error detector 14 will now be described with reference to FIG. 4. FIG. 4 illustrates a non-coherent (phase insensitive) cross-correlator 30 that is part of the delay error detector 14. FIG. 4a illustrates the output voltage of the cross-correlator of FIG. 4 versus delay. The cross-correlating delay error detector 14 cross-correlates the signals in the two delay paths.

A basic cross-correlator 30 may comprise a pair of Gilbert cell bandpass multipliers driven in phase quadrature as shown in FIG. 4. The first signal, Sa, is coupled to first inputs of upper and lower multipliers 32a, 32b in upper and lower signal paths. The second signal, Sb, is coupled by way of a 90° hybrid 31 to second inputs of the upper and lower multipliers 32a, 32b. Outputs of the upper and lower multipliers 32a, 32b are respectively coupled by way of upper and lower low pass filters 33a, 33b to upper and lower square law devices 34a, 34b (shown as $(\ )^2$). The output of the respective upper and lower square law devices 34a, 34b are coupled to an output summer 35 that generates a cross-correlated output signal. The cross-correlator 30 is thus phase insensitive.

Figure 5:
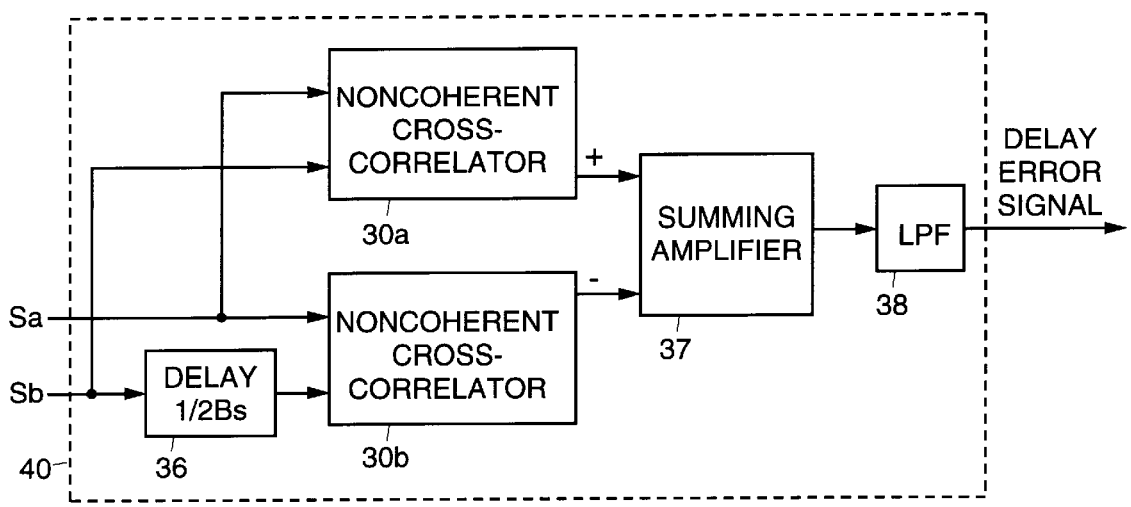
FIG. 5 illustrates a delay error detector employed in the present invention that is used for delay matching.

A pair of cross-correlators 30 may be used where the second cross-correlator 30 has a small delay inserted in one of its signal paths as is shown in FIG. 5. The realization of the cross-correlator 30 at IF relatively straightforward. Devices are currently available that provide for all of the functions of the delay error detector 14.

The differencing of the cross-correlators 30 forms a delay error discriminator 40, as shown in FIG. 5. FIG. 5 illustrates that the delay error detector 30 is used for delay matching. The delay error discriminator 40 comprises a delay 36 in a lower path and upper and lower noncoherent cross correlators 30a, 30b. A first signal, Sa, is coupled to first inputs of the upper and lower noncoherent cross-correlators 30a, 30b. a second signal, Sb, is coupled to a second input of the upper noncoherent cross-correlator 30a and through the delay 36 to a second input of the lower noncoherent cross-correlator 30b. Outputs of the upper and lower noncoherent cross correlators 30a, 30b are combined in a summing amplifier 37. The output signal from the summing amplifier 37 is filtered by a low pass filer 38 to produce a delay error signal.

Figure 5A:
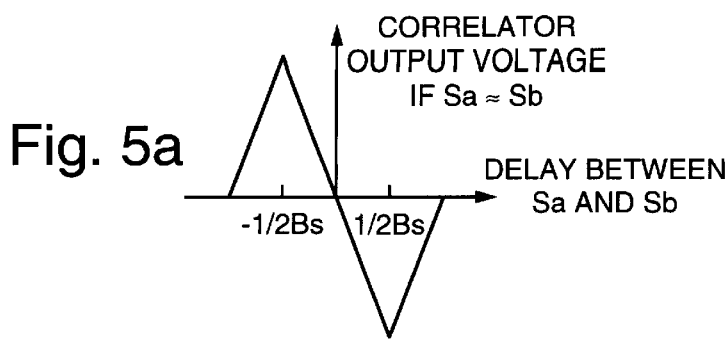
FIG. 5a illustrates the output voltage of the cross-correlator of FIG. 5 versus delay.

FIG. 5a illustrates the output voltage of the cross-correlator 30 of FIG. 5 versus delay. Observing the cross correlation peak at the same time as adjusting the new delay path for zero delay error guarantees a delay match between the upper and lower (old and new) paths through the delay system 10. When match occurs, the transfer of the signal using the-transfer clutch 15 is enabled.

Transfer operations and timing will now be discussed. It is assumed that the rate of differential delay is no more than 10 nanoseconds per second. In this instance, one second is allowable for reconfiguring the non-active delay path prior to the transfer of delays from one path to the other. During this (one second) interval, the following operations are performed. The time intervals shown are those estimated for the critical event path (other operations may be performed contemporaneously with those shown). The critical path switching time is estimated at 430 msec. Of course, all RF energy will exit the delays within a few microseconds, and thus does not contribute to the switching time.

The critical path switching time is determined using the following. An estimate of the incremental switched delay in the non-active path (5 msec). The time to compute a digital control word. The time to switch the incremental delay in the non-active path (25 msec for mechanical switching). The time to minimize (or maximize) the delay of the continuously variable controlled delay element 13. The time to cross-correlator the signal in the two paths (50 msec). The time to adjust the delay in the continuously variable controlled delay element 13 for best time matching (100 msec). The time to verify that there is sufficient continuously variable controlled delay element range available for the next future delay increment. The time to slowly transfer the signal path from the old delay path to the new delay path (200 msec).

Thus, delay systems that employ high bandwidth-time product continuously variable controlled delay elements have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A delay system comprising:
   a signal splitter for coupling an input signal along upper and lower signal paths;
   an upper discretely switched delay element disposed in the upper signal path;
   an upper continuously variable controlled delay element coupled to the upper discretely switched delay element;
   a lower discretely switched delay element disposed in the lower signal path;
   a lower continuously variable controlled delay element coupled to the lower discretely switched delay element;
   a delay error detector coupled to outputs of the upper and lower continuously variable controlled delay elements; and
   a signal transfer clutch coupled to the delay error detector which outputs a delayed output signal from the system.

2. The system recited in claim 1 further comprising a delay element controller coupled to the upper and lower discretely switched delay elements, the upper and lower continuously variable controlled delay element, the cross-correlating delay error detector and the signal transfer clutch.

3. The system recited in claim 1 wherein the delay error detector comprises a cross-correlating delay error detector.

4. The system recited in claim 1 wherein the continuously variable controlled delay elements each comprise a variable index fiber.

5. The system recited in claim 4 wherein the continuously variable controlled delay elements comprise:
   a tunable laser diode;
   a modulator for modulating light from the laser diode; and
   an optical detector for receiving modulated light transmitted by the optical fiber and outputting a modulated delayed signal.

6. The system recited in claim 1 wherein the discretely switched delay elements comprise an increment switched optical delay element including:
   a laser diode;
   a modulator for modulating light output by the laser diode;
   a plurality of serially coupled delay sections that each comprise an optical switch coupled by way of a section of optical fiber to an optical coupler; and
   an optical detector coupled to a last of the delay sections that outputs a modulated delayed signal.

7. The system recited in claim 1 wherein the optical switches comprise single pole, double throw optical switches.

8. The system recited in claim 1 further comprising a fiber amplifier coupled between a last of the delay sections and the optical detector.

9. The system recited in claim 1 wherein the delay error detector comprises a pair of Gilbert cell bandpass multipliers driven in phase quadrature.

10. The system recited in claim 9 wherein the delay error detector comprises:
    upper and lower multipliers disposed in upper and lower signal paths for receiving a first signal at first inputs;
    a 90° hybrid for receiving a second signal and for coupling the second signal to second inputs of the multipliers;
    upper and lower low pass filters coupled to outputs of the respective multipliers;
    upper and lower square law devices coupled to outputs of the respective low pass filters; and
    an output summer coupled to outputs of the respective square law devices.

11. The system recited in claim 9 wherein the delay error detector comprises:
    an upper cross-correlator for receiving first and second input signals at first and second inputs;
    a lower cross-correlator for receiving the first input signals at a first input;
    a delay for delaying the second input signal and for coupling the delayed second input signal to a second input of the lower cross-correlator;
    a summing amplifier coupled to outputs of the upper and lower correlators; and
    a low pass filter coupled to an output of the summing amplifier.

* * * * *